United States Patent
Engel et al.

(10) Patent No.: US 11,106,028 B2
(45) Date of Patent: Aug. 31, 2021

(54) MICROSCOPY DEVICE

(71) Applicant: Siemens Healthcare Diagnostics Inc., Tarrytown, NY (US)

(72) Inventors: Thomas Engel, Aalen (DE); Oliver Schmidt, Erlangen (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/753,755

(22) PCT Filed: Sep. 25, 2018

(86) PCT No.: PCT/EP2018/075881
§ 371 (c)(1),
(2) Date: Apr. 3, 2020

(87) PCT Pub. No.: WO2019/068503
PCT Pub. Date: Apr. 11, 2019

(65) Prior Publication Data
US 2020/0355902 A1    Nov. 12, 2020

(30) Foreign Application Priority Data
Oct. 6, 2017   (EP) ..................... 17195143

(51) Int. Cl.
*G02B 21/36* (2006.01)
*G02B 21/06* (2006.01)

(52) U.S. Cl.
CPC ........... *G02B 21/361* (2013.01); *G02B 21/06* (2013.01); *G02B 21/367* (2013.01)

(58) Field of Classification Search
None
See application file for complete search history.

(56) References Cited

U.S. PATENT DOCUMENTS 3,879,111 A * 4/1975 Goto ............... G02B 21/02
                                              359/659
6,452,625 B1   9/2002 Kapitza
(Continued)

FOREIGN PATENT DOCUMENTS

DE       2405446 A1    8/1974
DE    19635666 C1    12/1997
(Continued)

OTHER PUBLICATIONS

Sony Product Brief, Jan. 2008 (Year: 2008).*
(Continued)

*Primary Examiner* — Reza Aghevli
(74) *Attorney, Agent, or Firm* — Dugan & Dugan, PC

(57) ABSTRACT

An optical microscopy device for detecting cellular components of a sample, includes: a light source apparatus for emitting a light beam; a specimen carrier, which can be positioned in the beam path of the light beam, for receiving the sample; an objective lens which is provided downstream of the specimen carrier in the beam path of the light beam; and a camera chip which has pixels of a predefined pixel size, the camera chip being designed to detect the light beam after it passes through the objective lens and being designed to generate a camera image, a field number in the intermediate image downstream of the objective lens being greater than 25 millimeters.

20 Claims, 2 Drawing Sheets

(56) References Cited

U.S. PATENT DOCUMENTS

| | | | |
|---|---|---|---|
| 7,586,688 B2 | 9/2009 | Wiederhoft et al. | |
| 10,646,869 B2* | 5/2020 | Shirai | C12Q 1/6876 |
| 2006/0094868 A1* | 5/2006 | Giuliano | C12Y 304/22059 |
| | | | 536/23.2 |
| 2007/0121204 A1* | 5/2007 | Wiederhoft | G02B 21/0008 |
| | | | 359/386 |
| 2010/0194873 A1* | 8/2010 | Viereck | G02B 21/367 |
| | | | 348/79 |
| 2012/0312957 A1* | 12/2012 | Loney | G02B 21/002 |
| | | | 250/201.3 |
| 2014/0045170 A1* | 2/2014 | Patel | G01N 33/86 |
| | | | 435/5 |
| 2014/0093977 A1* | 4/2014 | Raphael | G01N 33/54386 |
| | | | 436/501 |
| 2016/0062098 A1* | 3/2016 | Brown | A61B 5/0071 |
| | | | 348/80 |
| 2016/0103308 A1* | 4/2016 | Furuya | G02B 21/361 |
| | | | 359/368 |
| 2016/0116724 A1* | 4/2016 | Abe | G02B 21/33 |
| | | | 359/656 |
| 2016/0209319 A1* | 7/2016 | Adalsteinsson | G06K 9/036 |
| 2016/0341945 A1* | 11/2016 | Ou | H04N 5/2256 |
| 2017/0176318 A1* | 6/2017 | Scarcelli | G01N 15/147 |
| 2018/0164570 A1* | 6/2018 | Tani | H04N 5/349 |
| 2018/0304262 A1* | 10/2018 | Shirai | B01L 3/502761 |
| 2018/0348497 A1* | 12/2018 | Sakamoto | G02B 21/34 |
| 2018/0356621 A1* | 12/2018 | Ward | G02B 21/18 |
| 2018/0364469 A1* | 12/2018 | Sakamoto | G02B 21/24 |
| 2018/0373014 A1* | 12/2018 | Sakamoto | G02B 21/34 |
| 2019/0056581 A1* | 2/2019 | Tomer | G02B 21/0048 |
| 2019/0137747 A1* | 5/2019 | Zhong | G02B 21/367 |
| 2019/0204577 A1* | 7/2019 | Faris | H04N 5/2256 |
| 2019/0235219 A1* | 8/2019 | Peng | G02B 21/26 |

FOREIGN PATENT DOCUMENTS

| | | | | |
|---|---|---|---|---|
| DE | 10306970 A1 | 9/2004 | | |
| DE | 102007033793 A1 | 1/2009 | | |
| EP | 0380904 A1 * | 8/1990 | | G01N 21/5911 |
| EP | 0380904 B1 * | 5/1994 | | G02B 21/002 |
| WO | WO-0127679 A1 * | 4/2001 | | H04N 1/3876 |
| WO | WO0127679 A1 | 4/2001 | | |

OTHER PUBLICATIONS

KAF-40000 7304×5478 CCD Image Sensor, Sep. 2015 (Year: 2015).*

KAI-50140, Oct. 2018 (Year: 2018).*

Sony Global News Release: Sony Develops 35mm full size CMOS Image Sensor with 24.81 Effective Megapixel resolution and extremely high signal conversion speed for use in Digital SLR Cameras; Jan. 30, 2008 (Jan. 30, 2008); XP055461217; Gefunden im Internet: URL: https://www.sony.net/SonyInfo/News/Press/200801/08-010E/ 2008.

Jaggi et al., "Design of a Solid-State Microscope"; Optical Engineering, Soc. of Photo-Optical Instrumentation Engineers, Bellingham, Bd. 28, No. 6, Jun. 1, 1989, pp. 675-682, XP000026297; ISSN: 0091-3286.

ISR & WO of International Application No. PCTEP2018075881 mailed Nov. 14, 2018.

EP Search Report of EP Application No. 17195143 dated Feb. 29, 2018.

* cited by examiner

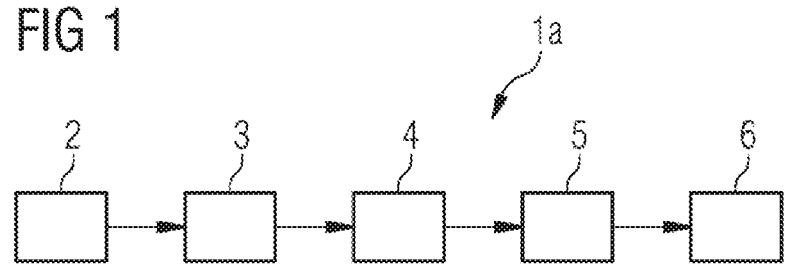
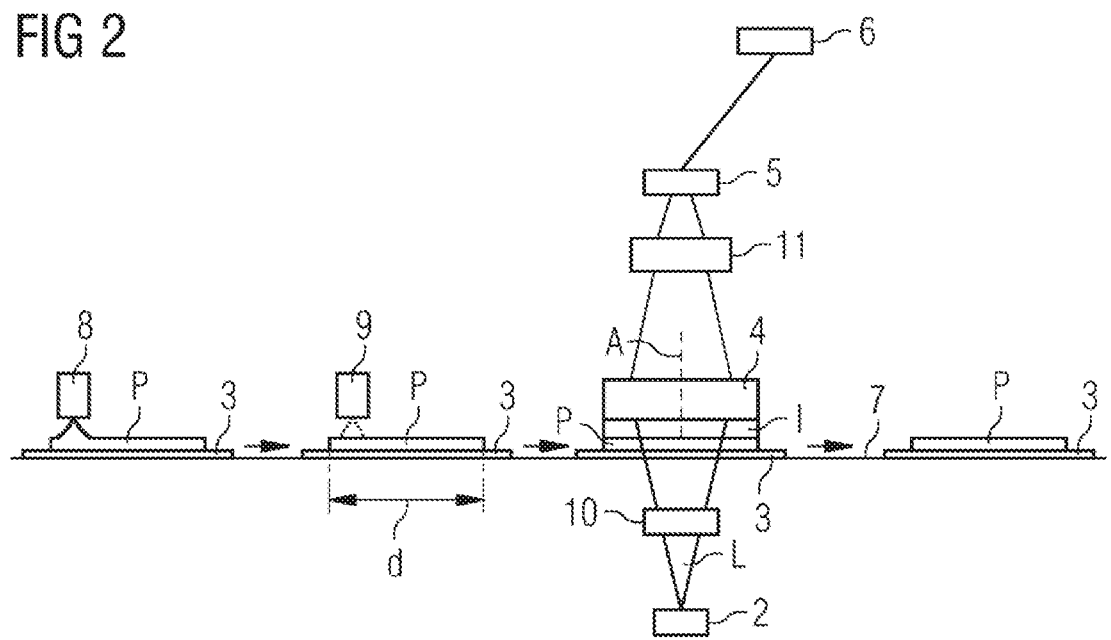

MICROSCOPY DEVICE

CROSS REFERENCE TO RELATED APPLICATIONS

This is a 371 of PCT/EP2018/075881, filed Sep. 25, 2018, which claims priority to European Patent Application No. EP 17195143.7, filed Oct. 6, 2017, both of which are hereby incorporated by reference herein in their entireties for all purposes.

FIELD

The invention relates to an optical microscopy device for detecting cellular components of a sample, i.e., in particular for analyzing body fluids, for instance, blood.

BACKGROUND

In hematology, analysis systems that combine microscopes with imaging methods are used for examining blood samples. In this regard, by way of example, the CellaVision® DM1200 system enables the localization and examination of cells in blood by means of digital image analysis.

The microscopes used in analysis systems of this type have resolutions on the object plane of approximately 0.1 micrometer, given a 100× magnification. With the use of camera chips having one megapixel, the field of view in object is approximately 100 micrometers in size. In order to detect blood samples having a width in the millimeters range, the blood sample therefore has to be scanned a number of times in a meandering scanning method, which may generally be time-intensive.

On account of the large number of blood samples to be examined in clinics and doctors' practices, the speed of the analysis is also of great importance, however, besides the accuracy of the analysis systems.

In order to accelerate the method, firstly an areal scan with a low resolution can be carried out in order to determine so-called regions of interest (RoI), i.e., regions of the blood sample having specific components which are relevant to the analysis. These regions are subsequently moved to and examined in a targeted manner with a higher magnification.

Such a two-stage method, too, is still relatively time-intensive. Furthermore, only information about the examined ROIs is afforded, but not about the complete blood sample. If further examinations reveal, for example, distinctive features necessitating an analysis of specific components not examined previously, the scan has to be carried out again. This often means the necessity of a renewed blood sample for the patient and a renewed expenditure of time for analysis for the examining laboratory.

There is thus a need for microscopy devices which enable larger regions of a blood sample to be examined quickly and accurately.

SUMMARY OF THE INVENTION

The problems described above are solved by means of an optical microscopy device having the features of patent claim 1. The dependent patent claims relate to preferred developments.

The invention accordingly provides an optical microscopy device for detecting cellular components of a sample. The microscopy device comprises a light source unit for emitting a light beam, an object carrier for receiving the sample, the object carrier being able to be arranged in a beam path of the light beam, and an objective lens arranged in the beam path of the light beam downstream of the object carrier. A camera chip is configured to detect the light beam after passage through the objective lens and to generate a camera image. The field number in the intermediate image downstream of the objective lens is greater than 25 millimeters.

The distinguishability of adjacent luminous structures can be specified by means of various criteria. If the distance between the structures corresponds approximately to the full width at half maximum of the intensity distribution, the structures are indistinguishable. As the distance increases, this results in a detectable decrease in brightness between the maxima, and the structures are distinguishable according to the so-called Sparrow criterion. Finally, if the intensity maximum of the first structure is at the intensity minimum of the second structure, the structures satisfy the so-called Rayleigh criterion.

While the human eye perceives changes in brightness logarithmically, in the case of camera chips these changes lead to a linear change in the signal. For this reason, for camera chips, adjacent structures are generally already distinguishable if they satisfy the Sparrow criterion, while the human eye typically requires a greater distance between the structures, that is to say that the latter must satisfy the Rayleigh criterion.

The human eye is able to distinguish objects separated from one another by approximately 0.2 mm to 0.3 mm. Since microscopes typically have eyepieces in order to be able to view the sample with the eye, the objective lenses are also adapted to the resolving power of the human eye. Eyepieces typically have magnifications of 10×, with the result that the image without the eyepiece magnification provides a resolution of 20 µm to 30 µm.

Modern camera chips have pixel sizes of typically less than 7 micrometers and, in the case of camera chips having tens of megapixels, a resolution of typically less than 5 or 3 micrometers and in the region of 1 micrometer in the case of very small pixel sizes. As a result, the optical magnification of the objective lens can be kept significantly smaller.

In order to enable the user to view the sample directly, a tube lens is also required besides the eyepiece. Typical focal lengths of the tube lenses are in the range of approximately 164 to 200 millimeters. Together with the typical length of the objective lens of at least 45 millimeters, the structural length, i.e., the distance between the object plane and the image plane, is far more than 200 millimeters since there is typically a distance of at least 50 mm between objective lens and tube lens in order to introduce further optical elements such as, for example, filters, beam splitters, polarizers, birefringent beam combiners for differential interference contrast or beam input couplings into the beam path.

The invention is based on the insight, then, that dispensing with a hitherto effected adaptation to the capabilities of the human eye makes it possible only then to fully utilize the capacities of modern camera chips.

The microscopy device is therefore configured in such a way that the field number in the intermediate image downstream of the objective lens is greater than 25 millimeters. In accordance with further embodiments, the field number can be greater than 30 millimeters or even greater than 35 millimeters, 40 millimeters, or 50 millimeters.

In this case, field number denotes the size or the diameter of the intermediate image in the optical system of the microscopy device, wherein the intermediate image is generated by the objective lens or optionally in interaction with a tube lens of the microscopy device on the basis of the objective lens magnification. In particular, this does not encompass subsequent magnification by projection units or camera tubes.

In accordance with a further embodiment of the microscopy device, the camera chip is configured to directly capture the intermediate image downstream of the objective lens.

In accordance with a further preferred embodiment of the microscopy device, a total magnification of the microscopy device is given by a quotient of a sampling in the object plane and the pixel size of the pixels of the camera chip. Sampling should be understood to mean the effective pixel size in the object plane. Furthermore, the resolution of the microscopy device is at least double the magnitude of the sampling. More generally, the resolution of the microscopy device is equal to the product of a sampling factor and the sampling. According to the Shannon-Nyquist theorem, the sampling factor is greater than 2 and preferably greater than 2.5.

In accordance with a further embodiment of the microscopy device, a total magnification of the microscopy device is at least double the magnitude of the quotient of pixel size and resolution of the microscopy device. More generally, the total magnification of the microscopy device is equal to the sampling factor, multiplied by the quotient of pixel size and resolution of the microscopy device, wherein the sampling factor is at least 2, preferably at least 2.5.

Furthermore, in the case of a specialized microscopy device, in contrast to the known microscopes, a tube lens is no longer absolutely necessary or can be integrated at least functionally directly into the objective lens. As a result, the microscopy device can preferably be configured in such a way that a small distance between the object carrier and the camera chip of less than 200 millimeters results. The distance between object carrier and camera chip can also be less than 160 millimeters, preferably less than 120 millimeters, and particularly preferably even less than 100 millimeters. The microscopy device is thus distinguished by a very compact construction. The smaller magnification required is thus also a key factor for the compact design. A simpler correction of imaging aberrations and a smaller magnification are also possible as a result of the compact and robust construction.

In accordance with a further embodiment, the total magnification of the optical microscopy device divided by the numerical aperture of the objective lens for light in the visible spectral range, e.g., for the average wavelength of 500 nanometers, is less than or equal to ten times the pixel size of the pixels of the camera chip. The specific design of the total magnification of the optical microscopy device is thus adapted to the optical properties of the camera chips. This is explained in greater detail below.

The minimum resolution $\delta$ is proportional to the quotient of the wavelength $\lambda$ of the light used and the numerical aperture NA:

$$\delta = k \cdot \lambda / NA$$

The proportionality constant k is dependent on the criterion used and is k=0.5 for the Sparrow criterion and k=0.61 for the Rayleigh criterion.

The resolution $\delta\_O$ on the object side is thus determined by the wavelength $\lambda$ of the light used and the numerical aperture NA_O of the objective lens:

$$\delta\_O = k\_O \cdot \lambda / NA\_O$$

On the image side, i.e., in the camera chip, the resolution $\delta\_I$ is determined by the numerical aperture NA_I of the camera chip, which is a function f of the pixel size d_pix and the sampling rate:

$$\delta\_I = k\_I \cdot \lambda / NA\_I$$

The resolution $\delta\_I$ is equal to the product of a sampling rate S and the pixel size d_pix, $$\delta\_I = S \cdot d\_pix.$$

The minimum sampling rate S is predefined by the Nyquist-Shannon theorem and is S=2.5. The minimum numerical aperture NA_I of the camera chip is thus dependent on the pixel size d_pix:

$$NA\_I = k\_I \cdot \lambda / (S \cdot d\_pix).$$

For a typical wavelength $\lambda$ of 500 nanometers, this yields:

$$NA\_I = k\_I \cdot \text{micrometers}/(5 \cdot d\_pix).$$

The total magnification V of the optical microscopy device corresponds to the quotient of the numerical aperture NA_O on the object side and the numerical aperture NA_I on the image side:

$$V = NA\_O/NA\_I = NA\_O \cdot 5 \cdot d\_pix[\text{micrometers}]/k\_I.$$

For the proportionality constant k_I on the image side, the value 0.5 is then chosen in accordance with the Sparrow criterion since the microscopy device is set for use of the camera chip. This yields:

$$V = NA\_O \cdot 10 \cdot d\_pix[\text{micrometers}].$$

Consequently, taking the Nyquist-Shannon theorem into consideration, the minimum magnification for a wavelength of 500 nm is given by ten times the pixel size in micrometers, multiplied by the numerical aperture of the objective lens. The magnification divided by the numerical aperture of the objective lens can be chosen in such a way that it is approximately or at least equal to ten times the pixel size in micrometers.

The following furthermore results:

$$1/NA\_I = V/NA\_O = 10 \cdot d\_pix[\text{micrometers}]$$

By way of example, for a numerical aperture of the objective lens of NA_O=1.3 with the use of an immersion liquid for different pixel sizes d_pix of 2 micrometers, 3 micrometers and 5 micrometers, for a wavelength of 500 nm, the following numerical apertures NA_I on the image side and respectively the following magnifications V thus result:

| | | |
|---|---|---|
| d_pix = 2 µm: | NA_I = 1/20, | V = 26, |
| d_pix = 3 µm: | NA_I = 1/30, | V = 39, |
| d_pix = 5 µm: | NA_I = 1/50, | V = 65. |

The pixel size d_pix,O on the object side is thus given by:

$$d\_pix,O = d\_pix/V = 2\ \mu m/26 = 3\ \mu m/39 = 5\ \mu m/65 = 77\ nm.$$

The corresponding resolution $\delta\_O$ is:

$$\delta\_O = S \cdot d\_pix,O = 192\ nm.$$

The depth of field DoF_O on the object side is given by:

$$DoF\_O = \pm \lambda / NA\_O^2.$$

For a numerical aperture NA_O of 1.3 and a wavelength $\lambda$ of 500 nanometers, a depth of field on the object side of DoF_O=±0.3 micrometer results. Preferably, on the image side, the focus is set by means of a precision control.

The depth of field on the image side is given by:

$DoF\_I = \pm \lambda / NA\_I^2$.

For a numerical aperture NA_I=1.3/V on the image plane or image side and a wavelength λ of 500 nanometers, this results in a depth of field on the image side for the various magnifications of:

| | |
|---|---|
| V = 12: | DoF_I = ±42 µm |
| V = 16: | DoF_I = ±76 µm |
| V = 20: | DoF_I = ±118 µm |
| V = 26: | DoF_I = ±200 µm |

In a further example, the numerical aperture of the objective lens NA_O=0.55. For different pixel sizes d_pix of 2 micrometers, 3 micrometers and 5 micrometers, the following numerical apertures NA_I on the image side and respectively magnifications V result:

| | | |
|---|---|---|
| d_pix = 2 µm: | NA_I = 1/20, | V = 11.0, |
| d_pix = 3 µm: | NA_I = 1/30, | V = 16.6, |
| d_pix = 5 µm: | NA_I = 1/50, | V = 27.5. |

The pixel size d_pix,O on the object side is thus given by:

$d\_pix,O = d\_pix/V = 2\ \mu m/11 = 3\ \mu m/16.6 = 5\ \mu m/27.5 = 182$ nm.

The corresponding resolution δ_O is:

$\delta\_O = S \cdot d\_pix,O = 455$ nm.

For a numerical aperture NA_O of 0.55 and a wavelength λ of 500 nanometers, a depth of field on the object side of DoF_O=±1.65 micrometers results.

For a numerical aperture NA_I=0.55/V on the image plane and a wavelength λ of 500 nanometers, this results in a depth of field on the image side for the various magnifications of:

| | |
|---|---|
| V = 11: | DoF_I = ±200 µm |
| V = 16.6: | DoF_I = ±455 µm |
| V = 27.5: | DoF_I = ±1250 µm |

In accordance with one preferred development, a structural length, i.e., a distance between the object carrier and the camera chip, is less than 200 millimeters.

In accordance with one preferred development of the microscopy device, a numerical aperture of the objective lens in air is greater than 0.5. The numerical aperture can be 0.55, for example. Preferably, the numerical aperture is greater than 0.8, and particularly preferably greater than 0.89. The lenses of the objective lens that are used for refracting light have a larger diameter than in the case of smaller apertures, which is compensated for by the more compact construction and the shorter structural length that becomes possible as a result of the larger image-side aperture. By restricting the total magnification, for the predefined numerical aperture of the objective lens, this results in a corresponding higher numerical aperture on the part of the camera chip, as a result of which the structural length is also minimized.

In accordance with one preferred development of the microscopy device, a magnification of the objective lens is less than or equal to 30 and preferably less than or equal to 20 and preferably less than or equal to 10. The small magnification makes it possible to image a large segment of the sample. On account of the adapted numeric apertures of the objective lens and of the camera chip, it is nevertheless possible to image or scan the sample with sufficiently high resolution.

In accordance with one preferred embodiment of the microscopy device, the resolution is less than one micrometer, preferably less than 0.5 micrometer and particularly preferably less than 0.15 micrometer. As a result, it is possible to analyze specific components in the sample, in particular cell structures in blood samples.

In accordance with one preferred development of the microscopy device, the camera chip has a pixel size of less than or equal to 7.5 micrometers, and preferably less than or equal to 5 micrometers. Particularly preferably, the pixel size is less than or equal to 3 micrometers, 2 micrometers, or even 1 micrometer. As a result of the small pixel sizes, sufficient resolutions can be achieved even with smaller magnification. The smaller total magnification means optical systems having fewer and more simply configured lenses, which can be provided significantly more compactly and more cost-effectively.

In accordance with one preferred development of the microscopy device, the camera chip has at least 30 megapixels and preferably at least 50 megapixels. Camera chips having such a high number of pixels have become available in comparatively cost-effective fashion in the meantime. The large number of pixels makes it possible to cover a larger field of view. For a camera chip having 50 megapixels in the typical 4:3 format of the cameras, the width of the imaged region of the sample is already 0.9 millimeter given a resolution of 0.1 micrometer and even 3.5 millimeters given a resolution of 0.4 micrometer. As a result, preferably, the entire width of the sample can be detected and examined.

By way of example, the numerical aperture of the objective lens with immersion can be 1.2 or even up to 1.4, with 40× magnification and a pixel size of 4 micrometers. An object resolution of 0.1 micrometer can be achieved as a result. Even a ten-fold magnification is sufficient for an object resolution of 0.4 micrometer.

In accordance with one preferred development of the microscopy device, a telecentric imaging is provided at least on the object side. As a result, it is possible to achieve constant or uniform imaging properties over the entire field of view. This is advantageous particularly in the case of the large fields of view preferably used.

In accordance with one preferred development of the microscopy device, the latter comprises an immersion liquid unit, such as, e.g., the Liquid Dispenser manufactured by Märzhäuser Wetzlar GmbH & Co. KG, of Germany (www.marzhauser.com), which introduces an immersion liquid, for instance oil or water, between the object carrier and the objective lens, and/or extracts the immersion liquid by suction.

The immersion liquid can be introduced by means of a nozzle or a tube. However, the immersion liquid can also be introduced by means of a diffuse structure in the housing of the objective lens, such that the immersion liquid is applied uniformly and without bubbles in the entire large field of view of the objective lens. The metering or the introduction of the immersion liquid can preferably be effected on that side of the objective lens which lies upstream of the optical axis of the optical assembly in the scanning direction of the measurement. Using an immersion increases the numerical aperture of the objective lens, wherein the numerical aperture is proportional to the refractive index of the immersion. As a result, the resolving power is additionally increased. In the case where a resolution of structures is greater than 0.4 micrometer, however, generally it is also possible to dispense with introducing the immersion liquid.

Furthermore, the immersion liquid unit can also be configured to introduce an immersion liquid, and/or extract it by suction, on the illumination side of the sample at the condenser device of the microscopy device.

In accordance with one preferred development of the microscopy device, the objective lens comprises aspherical optical elements and/or computer generated holograms and/or diffractive optical elements for optical imaging and/or optimization of the imaging quality. Optical elements of this type are advantageous in particular in the case of the larger lenses of the objective lens that are required for larger numerical apertures.

In accordance with one preferred development, the microscopy device comprises a movement device, which moves the object carrier linearly along a movement axis. The camera chip is configured to generate a multiplicity of camera images during the movement of the object carrier. An evaluation unit combines the generated camera images and generates an overall image of a strip-shaped region of the sample to be examined. The strip-shaped region has a width of preferably at least half a millimeter, more preferably of at least one millimeter and particularly preferably at least two millimeters. This can be achieved for a predefined numerical aperture by means of a suitable choice of the pixel size, number of pixels and magnification. As a result, the microscopy device is able to completely detect a strip-shaped applied sample by means of merely one-dimensional movement of the object carrier. For this purpose, the camera images are linked with the adjacent camera images merely at two opposite sides. The required overlap of the camera images is smaller than in the case of a meandering method since no additional overlap with lateral regions is required.

The movement device thus preferably moves the object carrier merely in one dimension, and not in two dimensions, and can be configured significantly more compactly and more cost-effectively as a result. Furthermore, the time required for detecting the entire sample is significantly reduced by virtue of the merely one-dimensional scanning.

Since the sample is detected in its entire dimensioning, high-resolution data of the entire sample are available directly. By storing these data, it is possible to evaluate them anew at a later point in time, for instance for the purpose of analyzing further components.

In accordance with one preferred development, the microscopy device comprises an applying unit, such as, e.g., the HEMAPREP® Automated Blood Smearing Instrument manufactured by J.P. Gilbert Co., Inc. of Boyertown, Pa., USA (www.hemaprep.com), which applies the sample to be examined to the object carrier, wherein the movement device is configured to introduce the object carrier with the applied sample into the beam path of the light beam. Compared with thick spreading by means of a blade as is widely used in the prior art, thin application has the advantage of a more homogeneous distribution of the sample and uniform spreading, e.g., of the different blood cells. This obviates the so-called streak with an accumulation of larger cells in the region of the end of a smear implemented with a blade, for example.

In accordance with one preferred development of the microscopy device, the latter comprises a staining unit, such as, e.g., the Leica ST5010 Autostainer XL manufactured by Leica Biosystems Inc. of Buffalo Grove, Ill., USA (www.leicabiosystems.com), which stains the sample applied to the object carrier before introduction into the beam path of the light beam. By virtue of the fact that merely one-dimensional transport of the sample is necessary, the latter can be applied at a first position, chemically stained at a second position, examined at a third position, and removed at a fourth position. The samples can thus be processed like a conveyor belt, such that a large number of samples can be analyzed in a short time.

In accordance with one preferred development of the microscopy device, optical elements are introduced in the beam path, such that the microscopy device is configured for differential interference contrast microscopy (DIC microscopy). For this purpose, by way of example, a linear or circular polarization filter can be embodied downstream of the light source unit, and polarizes the emitted light. The direction of polarization is then, e.g., at 45 degrees with respect to the edge directions of the object carrier. By way of example, a Wollaston prism splits the single perpendicular beam into two partial beams polarized perpendicularly to one another. A condenser arranged below the object carrier focuses the light beam onto the sample. After passing through the objective lens, the two partial beams are combined again by a further Wollaston prism. Components transmitted directly or with no effect on the polarization are removed by a second polarization filter. High contrasting of objects that affect the polarization of the light can be achieved by means of this method. In particular, as a result, preferably for some examinations it is possible to dispense with chemically staining the sample before the measurement, with the advantages described above.

In accordance with one preferred development, the microscopy device is configured for phase microscopy.

In accordance with one preferred development of the microscopy device, the latter comprises a polarizer, which polarizes the light beam before passage through the object carrier along a first plane of polarization. An analyzer is arranged downstream of the objective lens in the beam path and polarizes the light beam along a second plane of polarization. The optic assembly can be embodied as polarization-maintaining, for example. The camera chip can be configured in combination with a suitable filter, for example, in such a way that it is possible to switch between two distinguished directions of polarization. The switching can be effected by means of electro-optical elements or by means of elements containing liquid crystals. The polarization of the light can also be determined in order to determine further information about the sample examined. In this regard, a polarization effect occurs in the case of inclined surfaces, for example, in particular in the case of spherical leucocytes, elliptical thrombocytes, or biconcave erythrocytes. Furthermore, in their life cycle of approximately 90 days, the erythrocytes take up blood sugar substances which exhibit an optical activity. These polarization effects can be used for an extended blood analysis.

The small magnification preferred has the further advantage that the additional optical units for differential interference contrast microscopy or polarization microscopy can be embodied more compactly, which is advantageous on account of the high costs of some of these elements.

In accordance with one preferred development of the microscopy device, the evaluation unit is configured to identify structures in the sample to be examined on the basis of the overall image generated, using image processing methods. Specific components of blood, for example cells, cell clusters or sediments in blood, can be identified and automatically evaluated by means of image processing methods. For detection purposes, machine learning methods can be used, for example, principal component analyses (PCA) or neural networks, for instance convolutional neural networks (CNNs) or deep convolutional neural networks (dCNNs). Learning methods of this type can be used for classifying the cells found. As a result, in order to support the physician, the cells can be counted, anomalies can be detected and clinical pictures can already be diagnosed. The classification of the image contents and the diagnosis can also be carried out multimodally, that is to say, by repeated or parallel measurement of the sample with different optical measurement modalities.

In accordance with one preferred development of the microscopy device, the evaluation unit is configured to digitally stain the identified structures and to output a correspondingly stained overall image.

In accordance with one development of the microscopy device, the latter comprises an aligning unit, such as, e.g., the CellaVision® DM9600 manufactured by CellaVision AB of Sweden (www.cellavision.com), which is configured to align the object carrier relative to an optical axis and/or a depth of field range of the objective lens. In the case of a large numerical aperture, the depth of field is relatively small and is in the range of the wavelength of the light, that is to say for instance in the region of half a micrometer. An accurate alignment of the object carrier is therefore advantageous in order to realize sufficient focusing. The aligning unit can be operated mechanically manually or automatically actively by means of DC motors, stepper motors, or piezo drives. For this purpose, the microscopy device preferably comprises a sensor unit configured to identify the location of the object carrier relative to the optical axis and the working range of the objective lens, wherein the aligning unit aligns the object carrier using the identified location of the object carrier.

The above-described properties, features, and advantages of this invention and the way in which they are achieved will become clearer and more clearly understood in association with the following description of the exemplary embodiments which are explained in greater detail in association with the drawings.

BRIEF DESCRIPTION OF THE DRAWINGS

FIG. 1 shows a schematic block diagram of an optical microscopy device in accordance with one embodiment of the invention;

FIG. 2 shows a schematic cross-sectional view of a microscopy device in accordance with one embodiment of the invention;

DETAILED DESCRIPTION OF THE INVENTION

Figure 3:
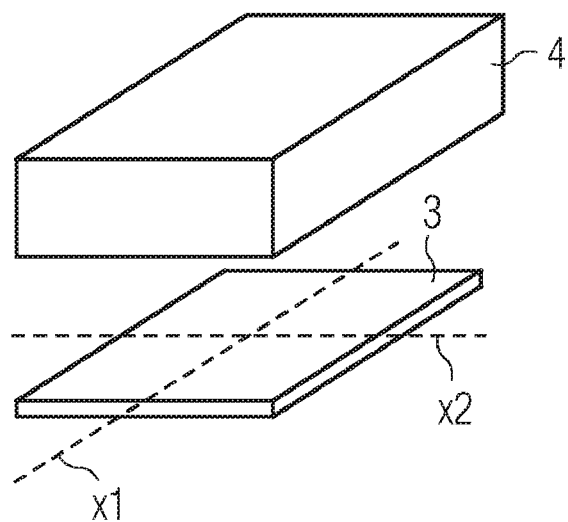
FIG. 3 shows a schematic oblique view of an alignable object carrier.

FIG. 1 illustrates a schematic block diagram of an optical microscopy device 1a in accordance with one embodiment of the invention.

The microscopy device 1a comprises a light source unit 2, which emits a light beam. The spectrum of the emitted light beam is preferably in the visible range or in the near infrared range. By way of example, the wavelength of the emitted light beam can be in the region of 500 nanometers. Arranged in the beam path of the light beam is an object carrier 3, with a biological sample to be analyzed, for instance a blood sample.

Preferably, a condenser for focusing the light beam is situated between the light source unit 2 and the object carrier 3.

An objective lens 4 is embodied in the beam path of the light beam downstream of the object carrier 3. The objective lens 4 is characterized by a magnification, a numerical aperture NA_O, and a field number. The numerical aperture NA_O of the objective lens 4 is greater than 0.5, preferably greater than 0.8, and particularly preferably greater than 0.9. Furthermore, the objective lens has a field number of more than 25 mm, preferably more than 30 mm, and particularly preferably more than 40 mm. The objective lens can thus detect a large region of the object carrier 3 with high resolution. The magnification of the objective lens 4 is preferably less than or equal to 20 and particularly preferably less than or equal to 10. The magnification is thus relatively small in order to be able to image a large region of the sample. Preferably, the magnification, the field number, and the numerical aperture of the objective lens 4 are chosen in such a way that a field of view of the objective lens has at least a width of half a millimeter, and preferably of at least one millimeter, and particularly preferably at least two millimeters.

The microscopy device 1 can comprise a turret mechanism, such that a plurality of objective lenses 4 can be introduced into the beam path of the light beam L alternately.

A camera chip 5 is arranged in the beam path of the light beam L downstream of the objective lens 4, the camera chip capturing the light beam L after passage through the sample applied on the object carrier 3 and after passage through the objective lens 4. The camera chip 5 is characterized by a number of pixels and a pixel size. Preferably, the camera chip comprises at least 30 and particularly preferably at least 50 megapixels. The pixel size is less than or equal to 7.5 micrometers, preferably less than or equal to 5 micrometers, and particularly preferably less than or equal to 3 micrometers. The image captured by means of the camera chip is transmitted to an evaluation unit 6, which further evaluates the image. The evaluation unit 6 can combine in particular a plurality of successively captured camera images, which image different segments of the sample, to form an overall image. Furthermore, the evaluation unit 6 can carry out an automatic image evaluation in order to identify specific structures in the captured image or overall image.

The evaluation unit 6 is embodied as a computing unit comprising at least one microprocessor. The evaluation unit 6 furthermore comprises a physical memory in order to store the individual images and/or the overall image. A renewed evaluation and analysis of structures on the basis of the overall image at a later point in time is possible as a result.

The total magnification V of the optical microscopy device 1a divided by the numerical aperture NA_O of the objective lens is less than or equal to ten times the pixel size of the pixels of the camera chip, the pixel size being measured in micrometers.

FIG. 2 illustrates a schematic cross-sectional view of an optical microscopy device 1b in accordance with a further embodiment. The object carrier 3 can be introduced into the beam path of the light beam L by means of a movement device 7 of the microscopy device 1. A plurality of stations depicted schematically is provided for preparing the sample P. In this regard, the sample is applied to the sample carrier 3 by means of an applying unit 8. In this case, the width of the applied sample is preferably less than or equal to the width of the field of view of the objective lens 4.

The sample applied to the object carrier 3 is stained by means of an optional staining unit 9. The movement device 7 subsequently introduces the object carrier 3 into the beam path of the light beam L. By means of the above-described light source unit 2, the objective lens 4, and the camera chip 5, as described above, a camera image is generated and is communicated to an evaluation unit 6.

Between the light source unit 2 and the object carrier 3 introduced into the beam path of the light beam L, it is possible for further first optical elements 10 depicted schematically to be introduced, which can comprise a condenser and additional optical lenses, filters, or polarizers. Likewise, between the objective lens 4 and the camera chip 5, it is possible for second optical units 11 to be introduced, for example, lenses, filters, or polarizers. However, the second optical units 11 can also be integrated directly into the objective lens 4. By means of the first and second optical units 10, 11, the optical microscopy device 1b can be configured for differential interference contrast microscopy or for polarization microscopy.

Furthermore, an immersion liquid I is preferably introduced between the objective lens 4 and the object carrier 3. The immersion liquid can be introduced by means of an immersion liquid unit (not shown) and can be extracted by suction again after the camera image has been captured.

Optionally, the immersion liquid unit can also be configured to introduce an immersion liquid between the condenser and the object carrier 3 and to extract the immersion liquid by suction after the camera image has been captured, wherein the immersion liquid can be chosen to be identical to or different than the immersion liquid I between objective lens 4 and object carrier 3.

Afterward, the object carrier 3 with the sample P is moved out of the beam path of the light beam L by the movement device 7 and the sample P can be removed from the object carrier 3.

On account of the preferably large numerical aperture of the objective lens 4, an aligning unit can furthermore be provided, which aligns the object carrier 3 relative to an optical axis A of the objective lens 4.

As shown in FIG. 3, for this purpose the sample carrier 3 can preferably be pivoted about a first axis X1 and a second axis X2 perpendicular thereto. An accurate focusing over the entire field of view can be achieved as a result. For this purpose, a sensor device can measure the accurate alignment of the object carrier 3 relative to the optical axis A of the objective lens and communicate a corresponding measurement signal to the aligning unit.

Figure 4:
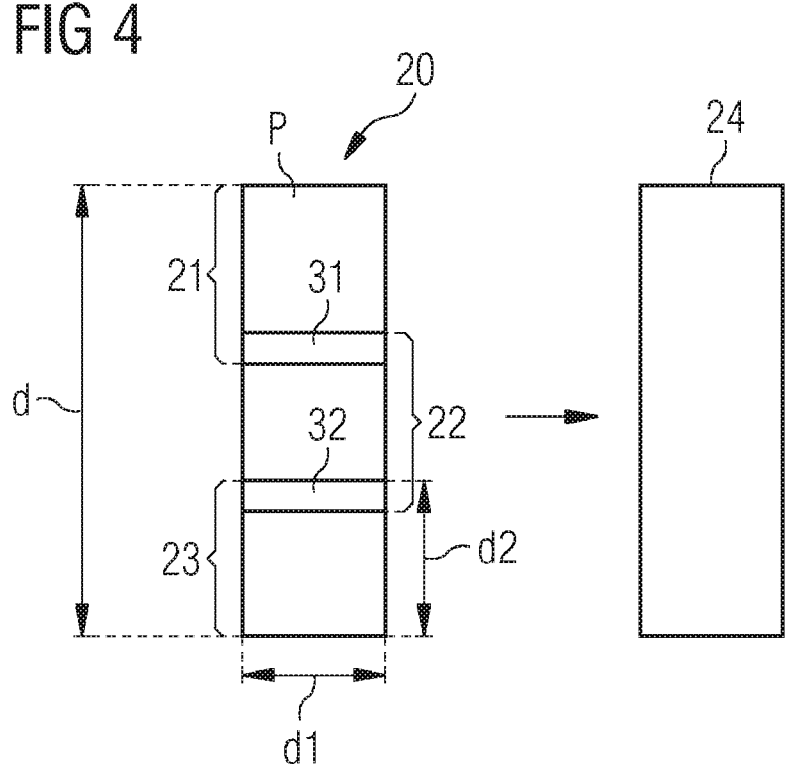
FIG. 4 shows a schematic plan view of a sample to be analyzed.

As shown in FIG. 4, the length d of the sample P can correspond to a multiple of the width dl of the sample and can be of substantially arbitrary magnitude. The width of that region of the sample P which is detected by means of the camera chip 5 is preferably equal in magnitude to the width dl of the sample P. By capturing and combining a plurality of camera images 21 to 23, an overall image 24 can thereby be generated by the evaluation unit 6, the overall image imaging the entire sample P. The overlap regions 31, 32 are chosen to be as small as possible, preferably less than 10 percent, particularly preferably less than 5 percent, of the image height. In accordance with further embodiments, the width of the imaged region can even be greater than the width of the sample P examined. With the use of a rectangular and non-square camera chip 5, the camera chip 5 is preferably aligned in such a way that the width direction of the sample P is imaged parallel to the longer side of the rectangular camera chip 5.

Although the invention has been more specifically illustrated and described in detail by means of the preferred exemplary embodiments, nevertheless the invention is not restricted by the examples disclosed and other variations can be derived therefrom by the person skilled in the art, without departing from the scope of protection of the invention.

The invention claimed is:

1. An optical microscopy device for detecting cellular components of a sample, comprising:
   a light source unit for emitting a light beam;
   an object carrier for receiving the sample, the object carrier being able to be arranged in a beam path of the light beam;
   an objective lens arranged in the beam path of the light beam downstream of the object carrier; and
   a camera chip configured to detect the light beam after passage through the objective lens and to generate a camera image, which is an intermediate image,
   wherein a field number in the intermediate image downstream of the objective lens is greater than 30 millimeters; and
   a distance between the object carrier and the camera chip is less than 200 millimeters.

2. The microscopy device as claimed in claim 1, wherein the camera chip is configured to directly capture the intermediate image downstream of the objective lens.

3. The microscopy device as claimed in claim 1, wherein a total magnification of the microscopy device corresponds to a quotient of a sampling in an object plane and a pixel size of pixels of the camera chip, and wherein a resolution of the microscopy device is at least double a magnitude of the sampling.

4. The microscopy device as claimed in claim 1, wherein a total magnification of the microscopy device is at least double a magnitude of a quotient of pixel size of pixels of the camera chip and resolution of the microscopy device.

5. The microscopy device as claimed in claim 1, wherein a numerical aperture of the objective lens in air is greater than 0.5.

6. The microscopy device as claimed in claim 1, wherein pixels of the camera chip have a pixel size of less than or equal to 7.5 micrometers.

7. The microscopy device as claimed in claim 1, wherein the camera chip has at least 30 megapixels.

8. The microscopy device as claimed in claim 1, further comprising an immersion liquid unit configured to introduce an immersion liquid between the object carrier and the objective lens or to extract the immersion liquid by suction.

9. The microscopy device as claimed in claim 1, wherein the objective lens further comprises aspherical optical elements or computer generated holograms or diffractive optical elements for optical imaging or optimization of the imaging quality.

10. The microscopy device as claimed in claim 1, further comprising:
    a movement device configured to move the object carrier linearly along a movement axis, wherein the camera chip is configured to generate a multiplicity of camera images during movement of the object carrier, and
    an evaluation unit configured to generate, by combining the generated camera images, an overall image of a strip-shaped region of the sample to be examined, wherein the strip-shaped region has a width of at least half a millimeter.

11. The microscopy device as claimed in claim 10, further comprising an applying unit configured to apply the sample to be examined to the object carrier, wherein the movement device is configured to introduce the object carrier with the applied sample into the beam path of the light beam.

12. The microscopy device as claimed in claim 11, further comprising a staining unit configured to stain the sample applied to the object carrier before introduction into the beam path of the light beam.

13. The microscopy device as claimed in claim 1, comprising optical elements introduced in the beam path, such that the microscopy device is configured for differential interference contrast microscopy.

14. The microscopy device as claimed in claim 1, further comprising an aligning unit configured to align the object carrier relative to an optical axis or a depth of field range of the objective lens.

15. The microscopy device as claimed in claim 1, wherein a numerical aperture of the objective lens in air is greater than 0.8.

16. The microscopy device as claimed in claim 1, wherein pixels of the camera chip have a pixel size of less than or equal to 5 micrometers.

17. The microscopy device as claimed in claim 1, wherein pixels of the camera chip have a pixel size of less than or equal to 3 micrometers.

18. The microscopy device as claimed in claim 1, wherein the camera chip has at least 50 megapixels.

19. An optical microscopy device for detecting cellular components of a sample, comprising:
 a light source unit for emitting a light beam;
 an object carrier for receiving the sample, the object carrier being able to be arranged in a beam path of the light beam;
 an objective lens arranged in the beam path of the light beam downstream of the object carrier; and
 a camera chip configured to detect the light beam after passage through the objective lens and to generate a camera image, which is an intermediate image, wherein:
 the objective lens has a magnification of less than or equal to 20 and has a field of view having a width of at least half a millimeter.

20. An optical microscopy device for detecting cellular components of a sample, comprising:
 a light source unit for emitting a light beam;
 an object carrier for receiving the sample, the object carrier being able to be arranged in a beam path of the light beam;
 an objective lens arranged in the beam path of the light beam downstream of the object carrier; and
 a camera chip configured to detect the light beam after passage through the objective lens and to generate a camera image, which is an intermediate image, wherein:
 the optical microscopy device has a resolution of less than one micrometer; and
 a distance between the object carrier and the camera chip is less than 200 millimeters.

* * * * *